US012324426B2

(12) United States Patent
MacDonald

(10) Patent No.: US 12,324,426 B2
(45) Date of Patent: Jun. 10, 2025

(54) EQUINE HOOF BOOT

(71) Applicant: SCOOTBOOT PTY LTD, Koonya (AU)

(72) Inventor: David Duncan MacDonald, Koonya Tasmania (AU)

(73) Assignee: SCOOTBOOT PTY LTD, Koonya (AU)

( * ) Notice: Subject to any disclaimer, the term of this patent is extended or adjusted under 35 U.S.C. 154(b) by 101 days.

(21) Appl. No.: 17/150,481

(22) Filed: Jan. 15, 2021

(65) Prior Publication Data
US 2021/0127656 A1 May 6, 2021

Related U.S. Application Data

(63) Continuation of application No. 14/777,201, filed as application No. PCT/AU2014/000249 on Mar. 13, 2014, now Pat. No. 10,925,273.

(30) Foreign Application Priority Data

Mar. 15, 2013 (AU) .................. 2013900903

(51) Int. Cl.
A01L 3/00 (2006.01)
A01K 13/00 (2006.01)

(52) U.S. Cl.
CPC .............. *A01L 3/00* (2013.01); *A01K 13/007* (2013.01)

(58) Field of Classification Search
CPC ..... A01L 3/00; A01L 3/02; A01L 3/06; A01L 5/00; A01K 13/007; A43B 23/028; A43B 23/04; A43B 23/042; A43B 23/045; A43B 23/047; A43B 11/00
USPC ................................. 168/18, 22, 4
See application file for complete search history.

(56) References Cited

U.S. PATENT DOCUMENTS

| 65,231 A | 5/1867 | Jennings |
| 70,035 A | 10/1867 | Sloat |
| 96,104 A | 10/1869 | Haedrich |
| 124,215 A | 3/1872 | Moran et al. |
| 149,930 A | 4/1874 | Higgins |

(Continued)

FOREIGN PATENT DOCUMENTS

| AU | 2013200509 A1 | 2/2013 |
| AU | 2014231767 A1 | 9/2014 |

(Continued)

OTHER PUBLICATIONS

International Search Report dated Apr. 11, 2014 for corresponding International Patent Application PCT/AU2013/000249, filed Mar. 13, 2014.

(Continued)

*Primary Examiner* — Morgan T Jordan
*Assistant Examiner* — Carly W. Lynch
(74) *Attorney, Agent, or Firm* — David D. Brush; Westman, Champlin & Koehler, P.A.

(57) ABSTRACT

An equine boot including a sole member having an interior for receiving a bottom of a hoof; and an upper for retaining the boot on the hoof, the upper having dorsal apertures such that when the boot is worn, bulbs of the hoof protrude through respective apertures. The apertures at least partially define a bulb-engaging element for engaging the peripheries of the bulbs so as to retain the bulbs in the apertures and impede rotation of the boot relative to the hoof.

16 Claims, 10 Drawing Sheets

(56) References Cited

U.S. PATENT DOCUMENTS

| | | |
|---|---|---|
| 167,895 A | 9/1875 | Hall |
| 177,991 A | 5/1876 | Cook |
| 267,855 A | 11/1882 | Fenley |
| 288,836 A | 11/1883 | Miller |
| 349,668 A | 9/1886 | St. John |
| 440,048 A | 11/1890 | Mayow |
| 448,312 A | 3/1891 | Barclay |
| D26,832 S | 3/1897 | Hirsch |
| 601,541 A | 3/1898 | Anderson |
| 617,153 A | 1/1899 | Galpin |
| 625,810 A | 5/1899 | Shappell |
| 630,310 A | 8/1899 | Agnew |
| 661,424 A | 11/1900 | Pflueger |
| 697,791 A | 4/1902 | Boumal |
| 708,983 A | 9/1902 | Bartlet |
| 719,687 A | 2/1903 | Nickerson |
| 759,636 A | 5/1904 | Ryan |
| 797,895 A | 8/1905 | Johnson |
| 798,598 A | 9/1905 | Conn |
| 840,892 A | 1/1907 | Emile |
| 918,556 A | 4/1909 | Kalm |
| 1,036,750 A | 8/1912 | Tuttle |
| 1,039,002 A | 9/1912 | Winston |
| 1,054,563 A | 2/1913 | Kiso |
| 1,096,912 A | 5/1914 | Herman |
| 1,129,683 A | 2/1915 | Jaffie |
| 1,211,268 A | 1/1917 | Zadina |
| 1,218,901 A | 3/1917 | Saxton |
| 1,270,207 A | 6/1918 | Preston |
| 1,274,483 A | 8/1918 | Wiesenberg |
| 1,294,896 A | 2/1919 | Grant |
| 1,298,364 A | 3/1919 | McCoy |
| 1,328,708 A | 1/1920 | Blondeau |
| 1,879,991 A | 9/1932 | Pratt |
| 2,064,566 A | 12/1936 | Richman |
| 2,535,394 A | 12/1950 | Davis |
| 2,572,889 A | 10/1951 | Strykower |
| 2,619,744 A | 12/1952 | Mattes |
| 3,364,500 A | 1/1968 | Fox |
| 3,439,670 A | 4/1969 | Schuerch |
| 3,486,561 A * | 12/1969 | Kulak .................. A01L 15/00 168/DIG. 1 |
| 3,794,119 A | 2/1974 | Paiso et al. |
| 3,867,905 A | 2/1975 | Vail, Jr. |
| 3,967,683 A | 7/1976 | Ensinozo |
| 4,019,463 A | 4/1977 | Kitchen |
| 4,185,695 A | 1/1980 | Hancock |
| 4,189,004 A | 2/1980 | Glass |
| 4,212,356 A | 7/1980 | Battle |
| 4,265,314 A | 5/1981 | Tovim |
| 4,346,762 A | 8/1982 | Tovim |
| D293,043 S | 12/1987 | Zamboni |
| 4,736,800 A | 4/1988 | Rohner |
| D295,907 S | 5/1988 | Decker |
| 4,744,422 A | 5/1988 | Dallmer |
| 4,981,010 A | 1/1991 | Orza et al. |
| 5,148,872 A | 9/1992 | Dallmer |
| D343,291 S | 1/1994 | Langford |
| 5,282,825 A | 2/1994 | Muck et al. |
| 5,345,656 A | 9/1994 | Merritt |
| D354,760 S | 1/1995 | Wolff |
| 5,481,888 A | 1/1996 | Perry |
| 5,511,756 A | 4/1996 | Spradling |
| 5,528,885 A | 6/1996 | Chamberlain |
| 5,600,901 A | 2/1997 | Leonor |
| D382,503 S | 8/1997 | Kalbach |
| D410,336 S | 6/1999 | Frisoni |
| 6,056,173 A | 5/2000 | Gillespie |
| 6,058,578 A | 5/2000 | Lan |
| 6,192,989 B1 * | 2/2001 | Tooman .................. A01K 13/007 54/82 |
| 6,305,328 B1 * | 10/2001 | Marquis .................. A01L 3/06 36/111 |
| 6,619,238 B1 | 9/2003 | Amato |
| 6,651,410 B2 * | 11/2003 | Osha .................. B68C 5/00 54/82 |
| 6,694,713 B1 * | 2/2004 | MacDonald .................. B68C 5/00 54/82 |
| 6,851,394 B1 * | 2/2005 | Young .................. A01K 13/007 54/82 |
| D505,259 S | 8/2005 | Heatherwick |
| 7,032,367 B1 * | 4/2006 | Yoho .................. A01K 13/007 54/82 |
| D543,697 S | 6/2007 | Heatherwick |
| D557,008 S | 12/2007 | Stiller |
| 7,302,788 B1 | 12/2007 | Chang |
| D568,148 S | 5/2008 | Tamura et al. |
| 7,445,051 B2 | 11/2008 | Ruetenik |
| D597,824 S | 8/2009 | Wang |
| 7,578,115 B2 | 8/2009 | Ford et al. |
| D614,018 S | 4/2010 | McClanahan et al. |
| D615,253 S | 5/2010 | Goodell |
| D629,290 S | 12/2010 | Stevens et al. |
| D638,330 S | 5/2011 | Fahrendorff et al. |
| 8,151,545 B1 | 4/2012 | Ford |
| D662,436 S | 6/2012 | Kalbach |
| 8,245,418 B2 | 8/2012 | Paintin et al. |
| D667,749 S | 9/2012 | Case et al. |
| D677,842 S | 3/2013 | Kalbach |
| D679,218 S | 4/2013 | Kalbach |
| 8,413,412 B2 | 4/2013 | Ford |
| D695,976 S | 12/2013 | Allen, Jr. |
| D699,144 S | 2/2014 | Kalbach |
| D711,602 S | 8/2014 | Driver |
| 8,931,244 B1 | 1/2015 | Gola |
| D743,691 S | 11/2015 | Romano |
| D765,413 S | 9/2016 | Derr |
| D770,170 S | 11/2016 | Akana et al. |
| 9,538,738 B2 | 1/2017 | Bergeleen et al. |
| 9,704,368 B2 | 7/2017 | Dehart |
| D793,075 S | 8/2017 | Ma et al. |
| D796,124 S | 8/2017 | Ying |
| D851,920 S | 6/2019 | Mouriz |
| 10,306,972 B2 | 6/2019 | Mendez et al. |
| 10,330,173 B1 | 6/2019 | McKye et al. |
| D854,916 S | 7/2019 | Derr |
| D880,148 S | 4/2020 | Akana et al. |
| D899,710 S | 10/2020 | MacDonald |
| 2007/0084020 A1 | 4/2007 | Chui et al. |
| 2007/0107389 A1 * | 5/2007 | Ruetenik .................. A01L 3/06 54/82 |
| 2007/0121987 A1 | 5/2007 | Fielding |
| 2008/0264005 A1 | 10/2008 | Ford |
| 2009/0120980 A1 | 5/2009 | Calayo |
| 2011/0000173 A1 | 1/2011 | Lander |
| 2013/0008139 A1 | 1/2013 | Lander |
| 2013/0014960 A1 | 1/2013 | Palmer et al. |
| 2013/0019575 A1 | 1/2013 | Bartlett |
| 2013/0105180 A1 | 5/2013 | Valer Fuentes |
| 2013/0112437 A1 | 5/2013 | Sledd et al. |
| 2014/0166006 A1 | 6/2014 | Meier |
| 2014/0231100 A1 | 8/2014 | Ford |
| 2014/0251642 A1 | 9/2014 | Revheim et al. |
| 2014/0262353 A1 * | 9/2014 | Bergeleen .................. A01L 3/00 168/4 |
| 2014/0331944 A1 | 11/2014 | Chirico |
| 2014/0367124 A1 | 12/2014 | Moller et al. |
| 2014/0374124 A1 | 12/2014 | Mahidhara |
| 2015/0060089 A1 | 3/2015 | Kunkle |
| 2015/0152942 A1 | 6/2015 | Kindstrand et al. |
| 2015/0238344 A1 | 8/2015 | Nylund |
| 2015/0366181 A1 | 12/2015 | Koenig et al. |
| 2016/0324136 A1 | 11/2016 | Silanus et al. |

FOREIGN PATENT DOCUMENTS

| | | |
|---|---|---|
| BR | 8307232 A | 8/1985 |
| CA | 2824535 A1 | 7/2012 |
| CN | 102811609 A | 12/2012 |
| CN | 103385228 A | 11/2013 |
| CN | 204206956 U | 3/2015 |
| CN | 204206957 U | 3/2015 |

(56) References Cited

FOREIGN PATENT DOCUMENTS

| | | | | |
|---|---|---|---|---|
| DE | 155659 | C | 7/1902 | |
| EP | 2409565 | A1 | 1/2012 | |
| EP | 2545771 | A2 * | 1/2013 | ........... A01K 13/007 |
| ES | 1072993 | U | 10/2010 | |
| ES | 1179958 | U | 3/2017 | |
| GB | 2052943 | A * | 2/1981 | ............... A01L 3/02 |
| GB | 2128867 | A | 5/1984 | |
| GB | 2338394 | A | 12/1999 | |
| GB | 2492266 | B | 5/2014 | |
| GB | 2517176 | A | 2/2015 | |
| IE | S86373 | B2 | 4/2014 | |
| IN | 2317DEN2015 | A | 8/2015 | |
| WO | 2008025065 | A1 | 3/2008 | |
| WO | 2014046634 | A1 | 3/2014 | |
| WO | 2014166006 | A1 | 10/2014 | |
| WO | 2014176705 | A1 | 11/2014 | |
| WO | 2015026253 | A1 | 2/2015 | |
| WO | 2015069307 | A1 | 5/2015 | |
| WO | 2015157817 | A1 | 10/2015 | |
| WO | 2015186036 | A1 | 10/2015 | |
| WO | 2015172211 | A1 | 11/2015 | |

OTHER PUBLICATIONS

Written Opinion of the International Searching Authority dated Sep. 15, 2015 for corresponding International Patent Application PCT/AU2013/000249, filed Mar. 13, 2014.
Partial European Search Report dated Oct. 13, 2016 for corresponding European Application No. 14765745.
Espacenet search results on Apr. 20, 2016 10:55—Shoe of hoof or hooves or feet or hose or equine or retain or secure or lock or bulb in teh title or abstract AND A01L1/low or A0L13/low as the IPC classification.
Notice of Allowance dated Jul. 22, 2020 for corresponding U.S. Appl. No. 29/677,621, filed Jan. 22, 2019.
Office Action dated Oct. 24, 2017 for corresponding U.S. Appl. No. 14/777,201, filed Sep. 15, 2015.
Final Office Action dated Jul. 5, 2018 for corresponding U.S. Appl. No. 14/777,201, filed Sep. 15, 2015.
Office Action dated Dec. 13, 2018 for corresponding U.S. Appl. No. 14/777,201, filed Sep. 15, 2015.
Final Office Action dated May 15, 2019 for corresponding U.S. Appl. No. 14/777,201, filed Sep. 15, 2015.
Office Action dated Nov. 4, 2019 for corresponding U.S. Appl. No. 14/777,201, filed Sep. 15, 2015.
Final Office Action dated Apr. 8, 2020 for corresponding U.S. Appl. No. 14/777,201, filed Sep. 15, 2015.
Notice of Allowance dated Oct. 15, 2020 for corresponding U.S. Appl. No. 14/777,201, filed Sep. 15, 2015.
International Search Report dated Sep. 13, 2019 for corresponding International Application No. PCT/AU2019/050761, Jul. 22, 2019.
Written Opinion of the International Searching Authority dated Sep. 13, 2019 for corresponding International Application No. PCT/AU2019/050761, filed Jul. 22, 2019.
Hufcheck—Floating Boots Model Traiuner 2014—English Version, 5 Screenshots, YouTube, (Jan. 20, 2015), URL: https://youtu.be/9Not4c_jpgc, [viewed on the Internet on Jan. 3, 2019].
Australian Examination Report for AU Application No. 2019268145, dated Nov. 17, 2020.

* cited by examiner

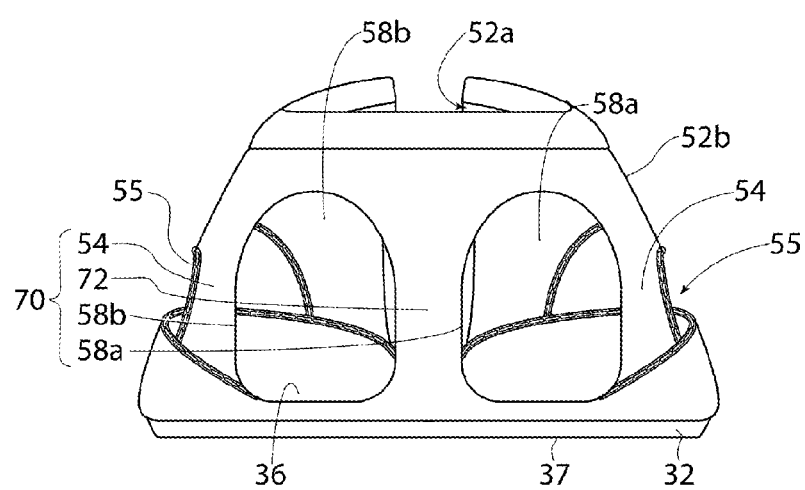
Fig. 2
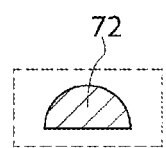

EQUINE HOOF BOOT

The present application is continuation of U.S. application Ser. No. 14/777,201, filed Sep. 15, 2015, which is a Section 371 National Stage Application of International Application No. PCT/AU2014/000249, filed Mar. 13, 2014 and published as WO 2014/138790 A1 on Sep. 18, 2014, in English, which claims priority from Australian Patent Application Nos. 2014231767 and 2017276238, the contents of which are incorporated herein by reference in their entireties.

The present invention relates to the field of equine hoof protection, particularly horse hoof protection.

There has been a long history of use of metal shoes to protect hooves of horses and other pack animals in the horse family. For thousands of years horses have been shod with metal horse shoes as a means of protecting the horse's hooves from abrasive surfaces. The metal horse shoe protects the outer periphery of the hoof wall and is attached to the hoof by nailing. Such shoes however are known to cause problems.

The main problem that arises with metal shoes is that they have to be replaced every six to eight weeks and this is expensive and time consuming. Aside from a regular replacement schedule, shoes need replacing because horses lose their shoes unexpectedly. In such an event the horse cannot be ridden until the missing shoe is replaced. It is also known in the industry that nailing metal shoes to the horse's hoof damages the hoof wall and increases concussion to the horse's hoof capsule and skeletal frame. In addition, restriction of normal movement of the hoof can lead to undesirable changes in the hoof and in some cases promote disease.

Hoof boots were first developed in the early 1970s partly in response to concern about the health of animals' hooves. The fact that hoof boots are intended only to be worn intermittently (when the horse is being ridden or trained) lessens the potential damage done by confining the hoof. Aside from protecting the hoof during riding, hoof boots were also developed for therapeutic reasons such as to protect a damaged hoof while it healed or to rehydrate hooves.

There are numerous patents and patent applications relating to horse hoof shoes and boots. Early examples of these include Adam (U.S. Pat. No. 840, 892) which discloses a horse shoe secured with straps which wrap around the hoof with a rear upwardly extending tongue and Herman (U.S. Pat. No. 1,096,912) which discloses a shoe with a heel stay also secured by a strap. A later example, Paiso (U.S. Pat. No. 3,794,119) describes a horse shoe with a contoured pocket and tongue which fit the rear of the hoof and is attached by a strap which completely encloses the hoof.

U.S. Pat. No. 7,032,367 in the name of Yoho discloses a hoof boot comprising a sole portion, a bell portion to fit over the front of the hoof and retaining straps.

U.S. Pat. No. 7,445,051 in the name Ruetenik relates to a boot assembly which as a shock absorbing pad for use inside a boot. The assembly may be used during normal riding or during treatment of a hoof problem.

U.S. Pat. No. 7,578,115 in the name of Easycare Inc discloses a slip-on horse boot with a replaceable pastern gaiter. This provides an anchor for the rear portion of the boot as a way of helping the boot stay in place.

US patent application No. 2013/0008139 in the name of Lander discloses a hoof boot which has a cage like heel captivator pivoted to the base.

US patent application No. 2013/0014960 in the name of Palmer and Palmer discloses a removable equine shoe for use in icy conditions which has a bulb loop attached to a pastern strap as a means of retaining the shoe.

US patent application No. 2013/0019575 in the name of Bartlett discloses a therapeutic horse boot with a raised sole platform and a central opening through which air can circulate.

A number of different horse boots are also on the market. These include Easyboot 25 Bare, the Boa@ Horse Boot and the Old Mac's G2.

While the horse boots currently on the market provide different fittings for keeping the boot on the hoof there is still room for improvement. Specifically there is still a need for a secure fitting light weight boot for use in the riding, training or working of horses and related animals.

The above references to and descriptions of prior proposals or products are not intended to be, and are not to be construed as, statements or admissions of common general knowledge in the art.

According to the present invention, there is provided an equine boot comprising:

a sole member having an interior for receiving a bottom of a hoof; and an upper for retaining the boot on the hoof, the upper having dorsal apertures such that when the boot is worn, bulbs of the hoof protrude through respective apertures, wherein the apertures at least partially define bulb-engaging means for engaging the peripheries of the bulbs so as to retain the bulbs in the apertures and impede rotation of the boot relative to the hoof.

The term 'equine" refers to a member of the horse family and includes horses, mules, donkeys and the like.

The term "hoof boot" refers to a device to safeguard the hoof from damage such as a boot, or a more open structure akin to a sandal or the like.

The term "a sole member suitable for engaging the ground" refers to a member which is suitably durable and, in use, engages with the ground similar to the sole of a shoe. The term does not refer to the anatomical region of the hoof known as the "sole".

The term "protecting the hoof" refers any means suitable for shielding or otherwise protecting the hoof, particularly the periphery of the hoof from damage. The periphery of the hoof corresponds to that part of the wall of the hoof which is in contact with the ground.

The term "retaining means" refers to any means suitable for securing the boot to the hoof or otherwise allowing the animal to wear the boot on its hoof.

The term "suitable size, shape and strength for securing the boot to the hoof" refers to the boot being of an appropriate size, shape and strength of material to provide an adequate boot.

The term "ventral portion" refers to that part of the boot that corresponds to the front or toe region of the hoof.

The term "dorsal portion" refers to that part of the boot that corresponds to the back or heel region of the hoof.

The term "a bulb engaging means for positively engaging the peripheries of the bulbs of the hoof" refers to a means which contacts and (when the boot is fitted appropriately) exerts pressure on the peripheries of the bulbs of the hoof akin to an interference fit. This is a type of form fit where the retaining means pushes the bulb engaging means into or onto the edges of the bulbs (as distinct from the cups of the bulbs) to allow settling of the hoof into the boot. The bulb engaging means cooperate with the other elements of the boot to limit lateral rotation of the boot. The term "peripheries of the bulbs" refers to the edges of the bulbs and includes the cleft of the bulbs.

The cleft of the bulb refers to the anatomical feature which corresponds to a groove or depression located between the bulbs on the hoof. Although strictly speaking this is not as anatomically distinct as the cleft of the frog it still constitutes a recess or niche in the anatomy of the heel of the hoof. Embodiments of the present invention utilize this recess or niche as a primary anchor point.

Preferably the bulb engaging means is fixed in relation to the sole member.

Preferably the retaining means comprises a shell of substantially non-deformable material.

Preferably said dorsal portion is open, substantially open or deformable so that when fitted, the bulbs of the hoof are free protrude to outside the shell and said bulb engaging means operate such that ventral and/or dorsal movement of the hoof in the boot is impeded.

The term "open or substantially open" refers to an aperture or vent in the retaining means which may have an additional elements.

The term "the bulbs of the hoof protrude to the outside" refers to the bulbs passing through the retaining means when the boot is fitted.

The term "ventral and/or dorsal movement" refers to movement from front to back or back to front in the boot.

The term "impeded" refers to hampering, inhibiting or hindering back and forth movement of the hoof.

Preferably part of the bulb engaging means is of a shape which is anatomically compatible with the cleft of the bulbs. More preferably the bulb engaging means includes a shank or web. More preferably the shank is adjacent arches which straddle the tops of the bulbs. Preferably the shank or web is half round in cross section.

Preferably the boot comprises a sole member with an interior surface on which, in use, the hoof sits and an opening suitable for fitting the boot to a hoof which in an open condition extends unobstructed from said interior surface through the retaining means. Even more preferably the opening is located at the front of the boot.

There is also disclosed herein an equine hoof boot comprising:

a) a sole member for engaging the ground and protecting a hoof; and b) a retaining means for securing the boot to the hoof said means having a ventral portion and a dorsal portion, wherein said dorsal portion is open or substantially open so that when the boot is fitted to the hoof, the bulbs of the hoof protrude outside of the boot, allowing peripheries of the bulbs to engage with the retaining means such that ventral and/or dorsal movement of the hoof relative to the boot is impeded.

There is also disclosed herein an equine hoof boot comprising:

a) a sole member for engaging the ground and protecting a hoof;

b) a retaining means for securing the boot to the hoof; and c) a bulb engaging means for positively engaging the peripheries of the bulbs of the hoof, the bulb engaging means including a cleft engaging member for positively engaging the cleft of the bulbs, wherein said retaining and engaging means impede rotation of the boot relative to the hoof.

The term "a cleft engaging means" refers to a means which contacts, meshes or interlocks with the cleft of the bulb.

The term "positively engaging the cleft of the bulbs of the hoof" refers to the means occupying the cleft or protruding into the cleft.

The term "impede rotation of the boot in relation to the hoof" refers to hampering, inhibiting or hindering axial or lateral rotation of the boot in relation to the animal's leg and hoof.

There is also disclosed herein an equine hoof boot which has an open condition and a closed condition, said boot comprising a ground-engageable sole member with an inside surface suitable for seating the hoof, an upper member for retaining the boot on the hoof when in the closed condition and an opening in the upper member, wherein in the open condition, the opening extends unobstructed from the upper member to the level of the inside surface for fitting of the boot, the boot including a bulb engaging means for positively engaging the peripheries of the bulbs of the hoof.

There is also disclosed herein a method of manufacturing an equine hoof boot of the above aspects of the invention.

There is also disclosed herein a method of manufacturing a hoof boot comprising: a) a sole member suitable for engaging the ground and protecting a hoof from wear; b) a retaining means of suitable size, shape and strength for securing the boot to the hoof said retaining means having an inside contactable with a hoof, an outside, a ventral portion located at its front and a dorsal portion located at its rear; and c) a bulb engaging means for positively engaging the peripheries bulbs of the hoof, wherein said retaining means and engaging means impede rotation of the boot relative to the hoof; said method comprising providing suitable material and assembling, moulding or otherwise forming the material into the boot.

Embodiments of the invention are partially predicated on the inventor's surprising realization that the anatomy of the hoof itself, specifically the cleft of the bulbs could be used as an anchor point to prevent a horse boot from rotating on the hoof.

The invention is further described by way of example only with reference to the 25 accompanying drawings in which:

FIG. 2 is a rear view of a first embodiment boot with an additional view of the shank in cross-section.

FIG. 7c is section A-A through FIG. 7a.

FIG. 7d is section B-B through FIG. 7a.

Figure 1:
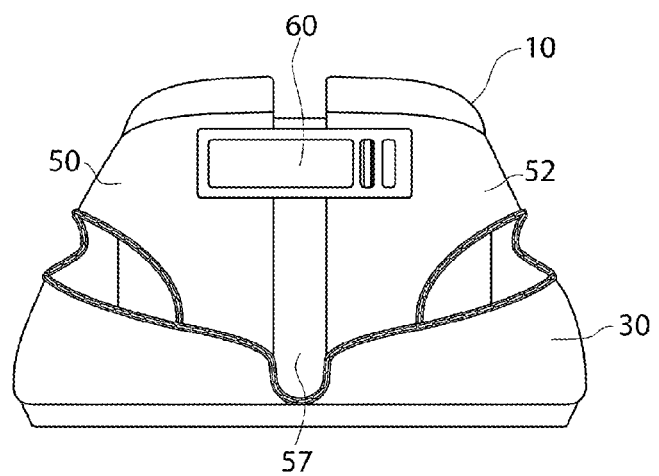
FIG. 1 is a front view of a first embodiment of the boot.
Figure 4:
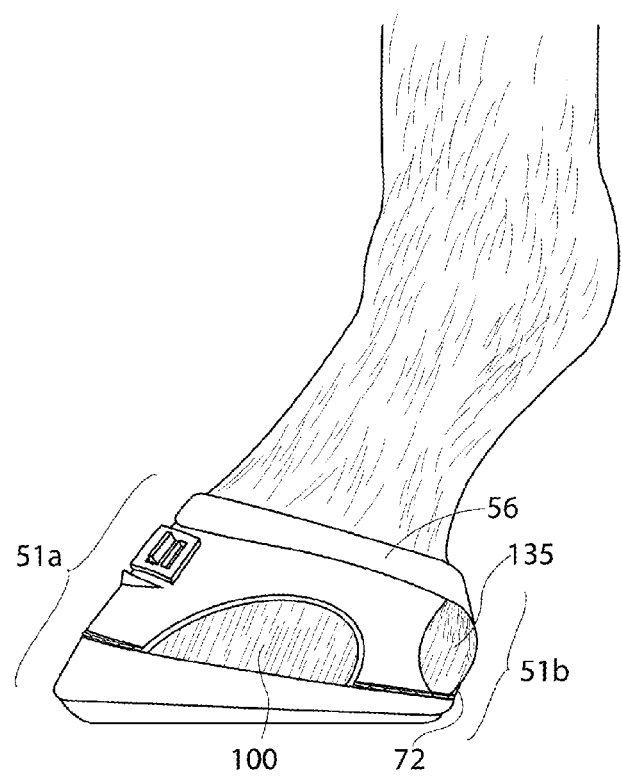
FIG. 4 is a side view of a first embodiment boot in a closed condition fitted to a hoof.
Figure 5:
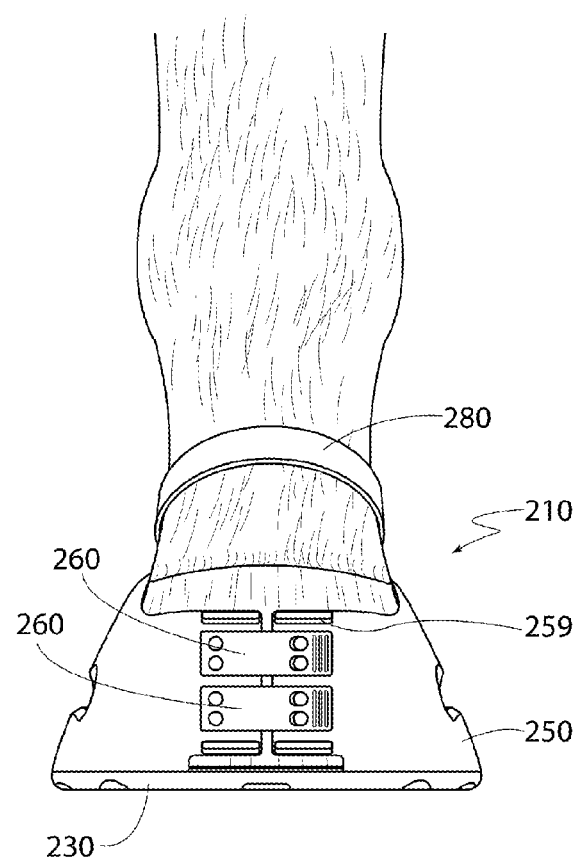
FIG. 5 is a front view a second embodiment of the boot in a closed condition fitted to a hoof.
Figure 6:
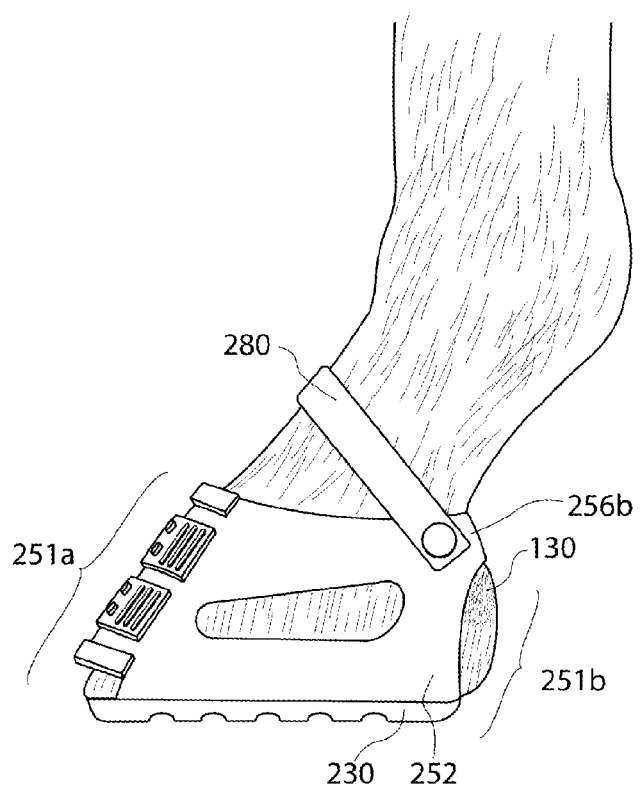
FIG. 6 is a side view of a second embodiment of the boot in a closed condition fitted to a hoof.
Figure 7A:
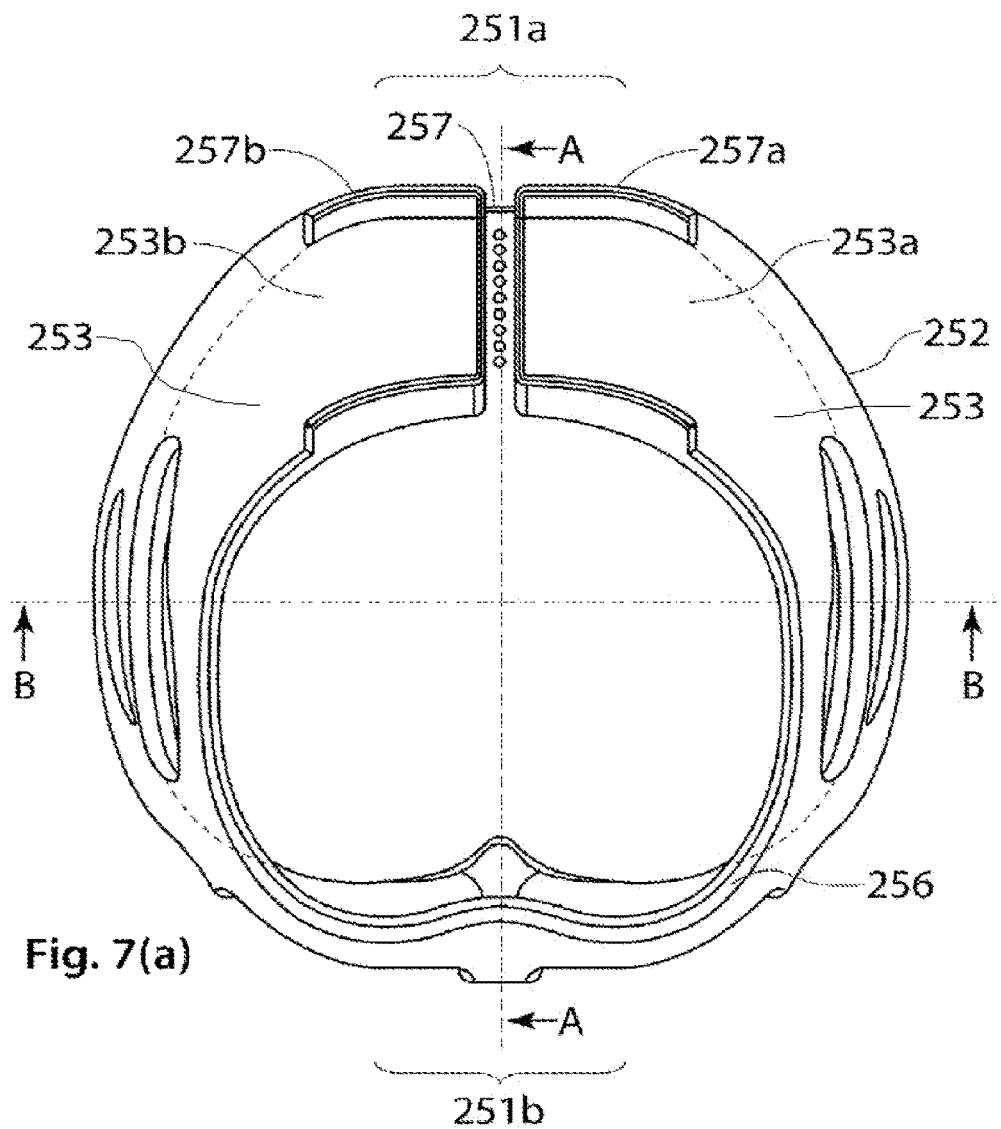
FIG. 7a is a top view of the shell of the second embodiment of the boot.
Figure 7B:
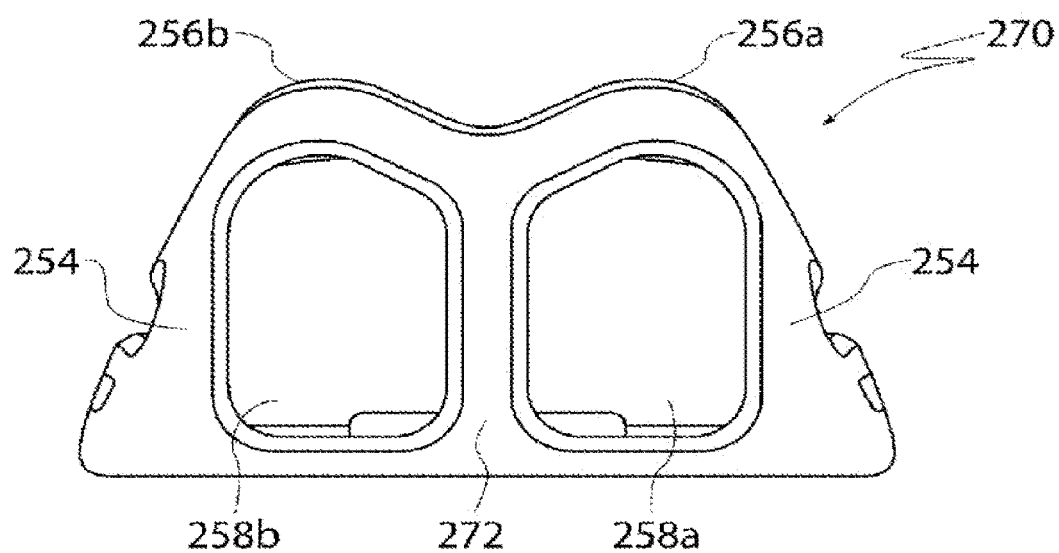
FIG. 7b is a rear view of the shell of the second embodiment of the boot.
Figure 7C:
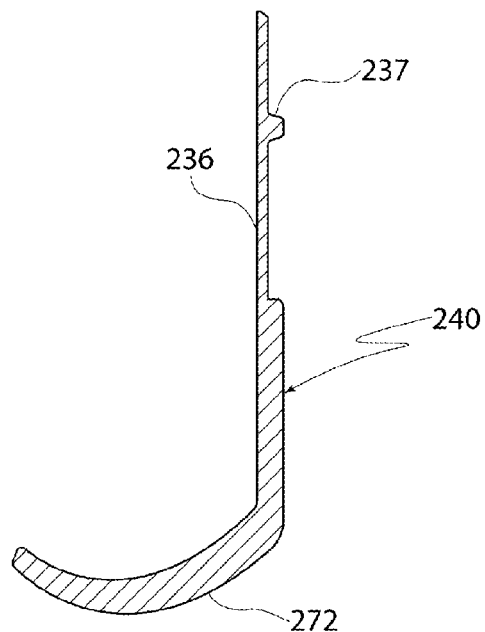
Figure 7D:
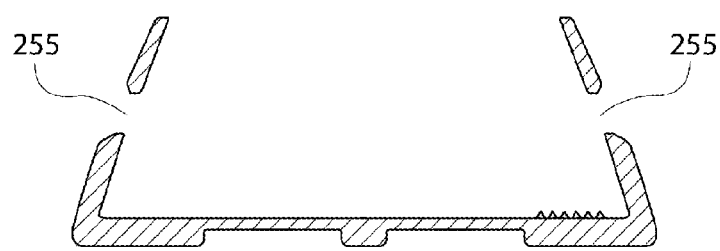
Figure 8:
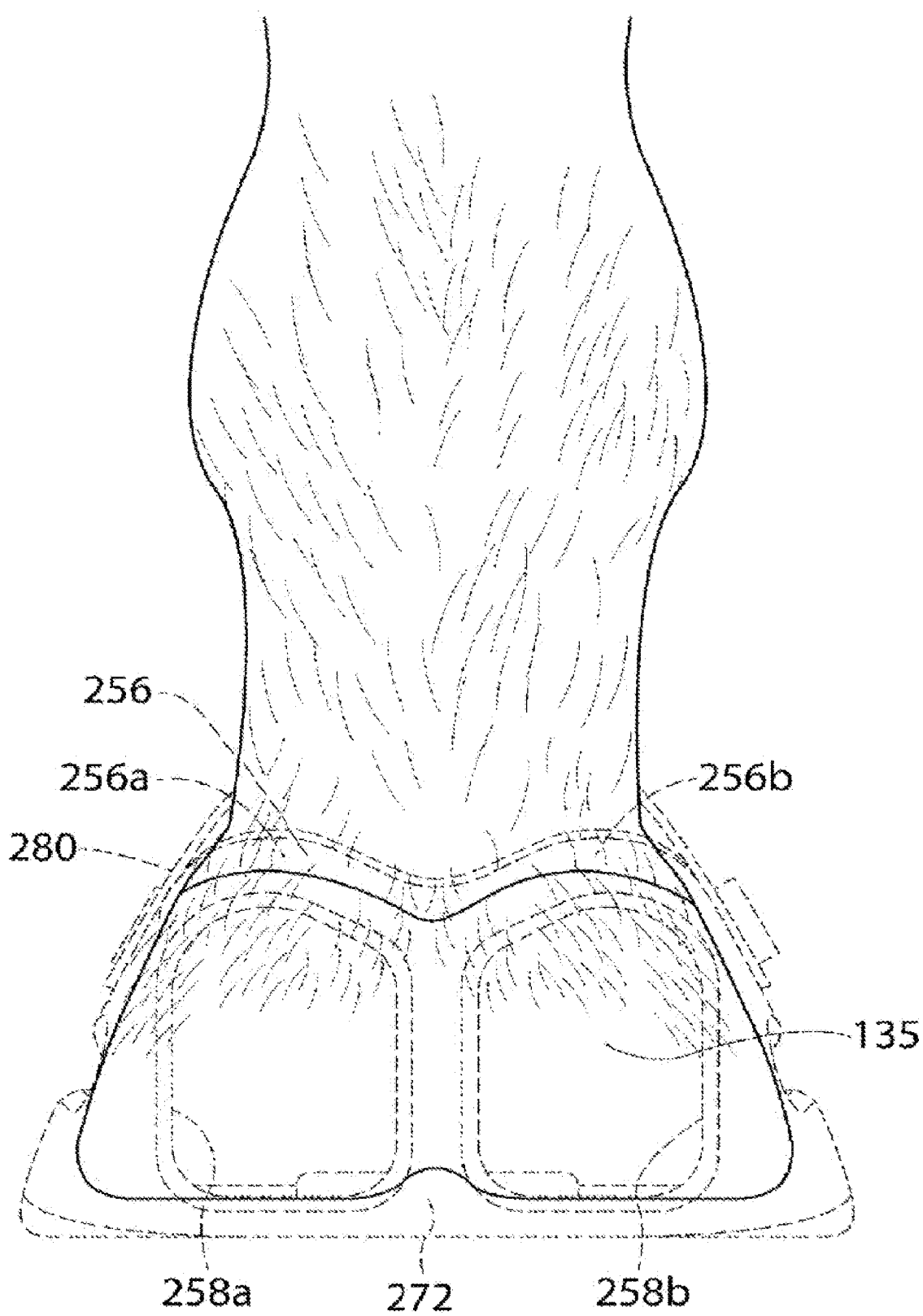
FIG. 8 is a rear view of the second embodiment of the boot showing fitting of the boot in ghost lines with the pastern strap omitted for clarity.

As seen in FIGS. 1 and 4, a first embodiment of the boot 10 comprises ground engaging sole member 30, retaining means 50 comprising boot upper 52 and strap 60, with ventral portion 51a located towards the front of boot and dorsal portion 51b located at the rear. The open character of boot 10 helps to provide a light weight boot.

Sole member 30 which forms the bottom of the boot comprises sole plate 32 with interior surface 36 and external surface 37 (FIG. 2). Interior surface 36 is suitable for seating the ground bearing portion or rim of hoof 100. Exterior surface 37 has a suitable tread. Sole member 30 may be constructed of various materials but the preferred material is TPU (thermoplastic polyurethane) which is a very hard wearing material suitable for the abrasive nature of a moving horse on its foot wear. TPU utilized may be of appropriate rigidity such as 95 Shore A hardness or 60 or 65 Shore D hardness. Boot upper 52 may be made of stiff leather or other suitable material and joined to sole member 30 by means of stitching.

Figure 3:
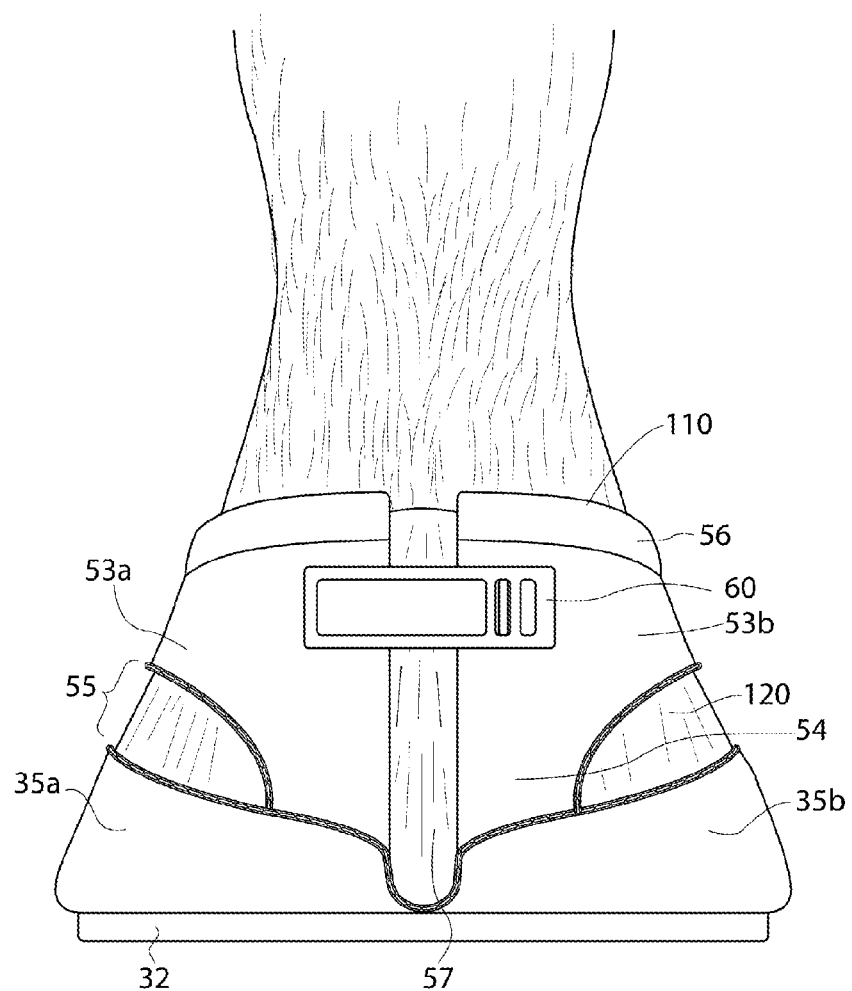
FIG. 3 is a front view of a first embodiment boot in a closed condition fitted to a hoof.

Upwardly depending sidewalls 35a and 35b of sole member 30 are sloped to mimic the angle of hoof wall 120 (FIG. 3). Although these are shown as continuous walls of constant cross section in the drawings it is envisaged that sidewalls 35a and 35b may be pleated, fringed or fluted to accommodate the different hoof wall anatomy of individual horses (some horses have very steep hoof walls while other has very sloped walls). Notably sidewalls 35a and 35b do not extend all the way around to heel 130 of hoof 100 providing a substantially open rear of boot 100 (FIG. 4).

Retaining means 50 comprises boot upper 52 with inside 52a and outside 52b. Boot upper 52 includes webs 53a and 53b which extend from the tops of sidewalls 35a and 35b up to collar 56. Webs 53 comprise two pairs of legs 54 (one pair at the front and one pair at the back) which define side vents 55. Side vents 55 provide air circulation and a means of escape for debris collected by the boot. Front opening 57 adjacent webs 53a and 53b extends from collar 56 at the top of boot 10 all the way to the level of interior surface 36 in sole plate 32.

Bulb engaging means 70 comprises shank 72, rear legs of pair 54 and apertures 5 58a and 58b at the back of boot 10. Shank 72 is advantageously half round in cross section as shown in FIG. 2. Shank 72 runs from sole plate 32 to collar 56. Bulb engaging means 70 is fixed in relation to sole member 30 and unlike the Lander boot of the prior art does not pivot.

When fitted, boot 10 snugly conforms to horse hoof 100. Collar 56 fits just on or above coronary band 110 of the hoof which is the area of the hoof where the hair on the horse's leg meets the smooth solid hoof wall 120. Boot 10 is in an open condition when strap 60 is unfastened. Front opening 57 allows boot 10 in the open condition to be opened up entirely to allow easy application of hoof 100 into the boot. Front opening 57 may be from 2 to 50 mm in width, preferably from 30 to 50 mm in width.

A tension snap lock comprising strap 60 and grips is used to secure the front two sides of the upper portion of boot 10 bring about the closed condition. Once hoof 100 is placed into boot 10 then the snap lock pulls the two front edges (webs 53a and 53b) of upper portion 52 together securing the front of the boot and ensuring the hoof is securely contained inside the boot. A tension snap lock is the preferred means for the securing and closure system but other forms of closure can be used such as buckles and the like.

Boot 210 (shown in FIGS. 5 to 9) is shallower in depth and simpler in construction than the first embodiment. Thermoplastic urethane (TPU), a durable, relatively rigid or non-deformable material is injection moulded to form sole member 230 and shell 252 as a unitary piece. The TPU used has an appropriate hardness value such as 95 Shore A hardness, 60 or 65 Shore D hardness or other suitable hardness. In this embodiment retaining means 250 comprises shell 252, front straps 260 and security strap 280. Straps 260 and strap 280 are also made of TPU. Strap 280 wraps around the upper pastern of the horse and provides an extra tether.

Figure 9:
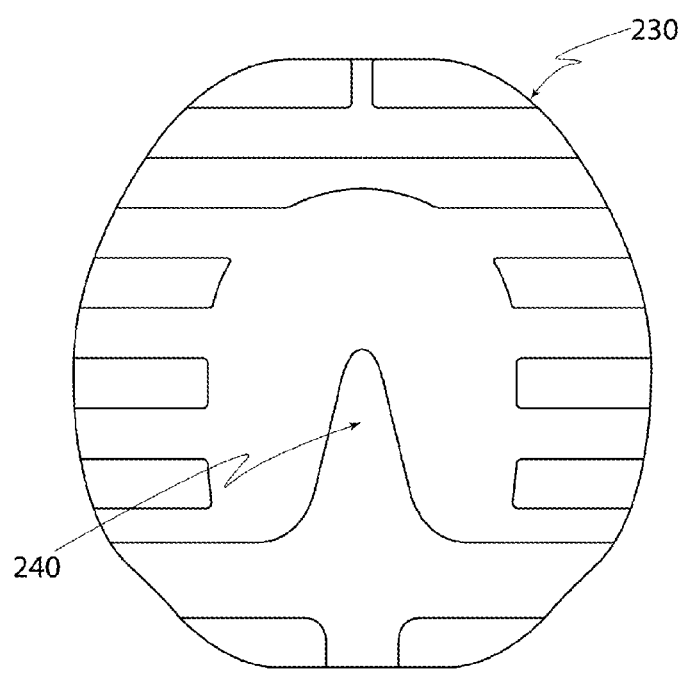
FIG. 9 is a bottom view of the second embodiment of the boot.

Sole member 230 comprises interior surface 236 and exterior surface 237 (FIG. 7c) with frog support 240 and has an appropriate tread in the area that corresponds to the wall of the hoof (FIG. 9). Viewed from below sole plate 230 is a distorted '0' shape with a broader dorsal region and an opposite blunted ventral end mimicking the basic shape of the sole of a hoof.

Shell 252 has ventral portion 251a and dorsal portion 251b and comprises side walls 253 and bulb engaging means 270 which extend upwardly from sole member 230.

Sidewalls 253 extend from front flaps 253a and 253b around to rear legs 254 with side vents 255.

Front opening 257 sits between front flaps 253a and b with lateral slits 257a and 257b above sole member 230. Each strap 260 is riveted at one end to front flap 253b and has appropriate apertures at the other end to allow fastening to knob hooks mounted on front flap 253a adjacent front opening 257. Lugs 259 located above and below straps 260 help protect the straps from wear.

Upper edge 256 sits below hairline at the front of hoof 100 as there is no collar in this embodiment. Upper edge 256 of sidewalls 253 is curved upwards into arches 256a and 256b at rear of boot. Security strap 280 is removably attached to arch 256a with a stud at one end and, at the opposite end has appropriate apertures to engage with knob hooks on arch 256b at the rear of boot 210.

Dorsal portion 251b is substantially open due to apertures 258a and 258b. Bulb engaging means 270 is provided by arches 256a and b, rear legs 254 and shank 272 which runs between upper edge 256 and sole member 230.

Apertures 258a and 258b are ovoid in shape and design be seated around the periphery of bulbs 135 when boot 210 is fitted.

Bulb engaging means 270 is essentially 'm' shaped and is particularly suited to engaging the periphery of the bulbs.

The open rear of the boot and the enclosed ventral portion causes the bulbs to be pushed out of the open back of boot 210 and forced into bulb engaging means 270 providing a fit akin to a form fit or a friction fit.

Although in the embodiment illustrated the dorsal portion of the boot is open, it is contemplated that the dorsal portion could be covered by a soft or pliable material such as a mesh or netting (i.e. a material which would not put any effective pressure on the cups of the bulbs) which would still allow the bulbs to be pushed back against the bulb engaging means 270.

While the prior art requires the periphery of the sole member and upper portions of the sole member to conform as closely as possible to the shape of the horse's hoof wall to minimize movement of the hoof within the boot, embodiments of the present invention provide a more versatile fit. This is because the inventor utilizes the bulbs to provide anchoring.

The rear of boot 10, 210 is an important feature of embodiments of this invention. The rear of boot 10, 210 has dorsal portion 51b, 251b which is open, or substantially open around heel of hoof 130. The open heel allows bulbs 135 of hoof 100 to be accommodated on the outside of boot 10, 210 rather than inside the boot which is the practice of traditional hoof boots. Bulbs 135 of the hoof 100 are anchored by shank 72, 272. This shape of the rear of the boot moulds to the shape of bulbs 135 and locks the bulbs into this area of the boot which prevents the boot from moving backwards and forwards and from rotating on the hoof. At the same time shank 72 and collar 56 or shank 272 and curved member in the form of upper edge 256 prevent the boot pulling downwards preventing sole member 30, 230 from losing contact with the sole of the hoof. This combination of features locks the bulbs firmly into the rear of the boot, prevents the boot rotating and separating from the sole of the hoof. Specifically the shank lies over the cleft in the dorsal part of the bulbs and this is the feature which prevents the boot moving away from the heels of the hoof. The shank which engages the cleft of the bulbs is combined with an upper which is either a collar or a curved member which lays over the upper dorsal part of the bulbs and extends down the lateral sides of the bulbs. These associated lateral structures are what prevent the boot rotating by "capturing" or gripping the peripheries of the bulbs but do not put any effective pressure on the cups of the bulbs. These functions provide ultimate security not achieved with prior art hoof boots.

Example 1: Construction of the Boot

A person skilled in the art will be familiar with the materials and construction methods employed to make a hoof boot, for example those disclosed in the prior art discussed earlier.

In the second embodiment, shell 252 and sole member 230 of boot 210 is produced by an injection moulding process making it an integral one piece construction. TPU of 60 Shore D hardness by Bayer(E' is injected into the mould, left for an appropriate time to harden and then removed. Separate straps made of TPU of an appropriate hardness are attached onto shell 252.

It is envisaged that the boot will be made in a number of different sizes to cover the range of most hooves. Boots start at size 4 (135 mm wide by 130 mm long). Hoof size is determined by measuring the front of the toe straight over the middle of the frog down to the buttress of the heel (being the furthest part of the ground bearing area of the hoof).

Further it is envisaged that the boot shell may be produced by laser sintering techniques using suitable TPU or other materials.

Although modifications and changes maybe suggested by those skilled in the art, it is the intention of the applicant to embody within the patent warranted hereon all changes and modifications as reasonably and probably come within the scope of this contribution to the art. The features of the present invention which are believed to be novel are set forth in detail in the appended claims. The features disclosed in the description, the figures as well as the claims could be essential alone or in every combination for the realization of the invention in its different embodiments.

Throughout this specification and the claims which follow, unless the context requires otherwise, the word "comprise", and variations such as "comprises" and "comprising", will be understood to imply the inclusion of a stated integer or step or group 35 of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

What is claimed is:

1. An equine boot comprising a shell having:
a sole for receiving a bottom of a hoof; and
an upper extending upwardly from a front and sides of the sole for enclosing a front and sides of the hoof, the upper comprising sidewalls extending upwardly from respective sides of the sole to upper edges of the sidewalls, a horizontally elongate opening being formed at least partially in a lower portion of each sidewall via which, in use, debris in the boot can escape, each opening extending between and being centrally disposed relative to a front and a rear of the boot, each opening being completely circumscribed by a continuous unitary piece of material of a respective one of the sidewalls, and each opening terminating below the upper edge of the respective sidewall,
wherein the rear of the boot comprises a dorsal portion positioned to engage an upper periphery of bulbs of the hoof to impede rotation of the boot relative to the hoof.

2. The equine boot of claim 1, wherein the dorsal portion comprises a respective arch configured to engage the upper periphery of each bulb.

3. The equine boot of claim 2, wherein the dorsal portion comprises a shank or web configured to engage a cleft of the hoof.

4. The equine boot of claim 3, wherein the shank or web extends between the arches and the sole.

5. The equine boot of claim 2, wherein the dorsal portion comprises apertures such that when worn, at least a portion of each bulb is uncovered by the boot.

6. The equine boot of claim 5, wherein when worn, at least a portion of the bulbs protrude through respective apertures.

7. The equine boot of claim 2, wherein the dorsal portion comprises a substantially m-shaped configuration.

8. The equine boot of claim 1, wherein the sole and the upper are integrally formed.

9. The equine boot of claim 8, wherein the sole and the upper are moulded as a unitary piece.

10. The equine boot of claim 1, wherein the sole and the upper are formed of the unitary piece of material, the material being a moulded material.

11. The equine boot of claim 10, wherein the moulded material comprises thermoplastic urethane.

12. The equine boot of claim 11, wherein the thermoplastic resin has a 95 Shore A hardness, or a 60 or 65 Shore D hardness.

13. An equine boot comprising:
a front and a rear;
a shell having:
a sole for receiving a bottom of a hoof;
an upper extending upwardly from a front and sides of the sole, the upper comprising sidewalls extending upwardly from respective sides of the sole to upper edges of the sidewalls, a horizontally elongate opening being formed at least partially in a lower portion of each sidewall, each opening extending between and being centrally disposed relative to the front and the rear of the boot, each opening being completely circumscribed by a continuous unitary piece of material of a respective one of the sidewalls, and each opening terminating below the upper edge of the respective sidewall; and
a dorsal portion at the rear of the boot positioned to engage an upper periphery of bulbs of the hoof to impede rotation of the boot relative to the hoof and comprising:
first and second arches spaced from the sole;
a shank or web which is centrally disposed at the rear of the boot and extends between the arches and the sole;

a first hoof bulb aperture defined at least partially by the first arch, the shank or web and the sole; and a second hoof bulb aperture defined at least partially by the second arch, the shank or web and the sole; and a security strap extendable along the front of the boot, between the first and second arches, the security strap being separated from an upper edge of the upper.

14. The equine boot of claim 13, wherein the sole and the upper are formed of the unitary piece of material, the material being a moulded material.

15. The equine boot of claim 14, wherein the moulded material comprises thermoplastic urethane.

16. The equine boot of claim 15, wherein the thermoplastic resin has a 95 Shore A hardness, or a 60 or 65 Shore D hardness.

\* \* \* \* \*